United States Patent [19]

Otani et al.

[11] Patent Number: 4,664,074
[45] Date of Patent: May 12, 1987

[54] APPARATUS FOR COOLING AN INTERCOOLER

[75] Inventors: Tetsurou Otani, Toyota; Shigeji Takumi, Kasugai; Choichi Suzuki, Susono, all of Japan

[73] Assignee: Toyota Jidosha Kabushiki Kaisha, Aichi, Japan

[21] Appl. No.: 865,271

[22] Filed: May 21, 1986

[30] Foreign Application Priority Data

Jun. 10, 1985 [JP] Japan .................................. 60-124372

[51] Int. Cl.$^4$ .............................................. F01P 3/12
[52] U.S. Cl. .................................. 123/41.31; 123/563
[58] Field of Search ................ 123/41.31, 563; 60/599

[56] References Cited

U.S. PATENT DOCUMENTS

| 3,203,499 | 8/1965 | Bentz et al. | 60/599 |
|---|---|---|---|
| 3,439,657 | 4/1969 | Gratzmuller | 123/41.31 |
| 4,075,991 | 2/1978 | Mettig et al. | 123/41.31 |
| 4,356,796 | 11/1982 | Tholen | 123/41.31 |
| 4,362,131 | 12/1982 | Mason et al. | 123/41.31 |

FOREIGN PATENT DOCUMENTS 59-75515 5/1984 Japan .

*Primary Examiner*—William A. Cuchlinski, Jr.
*Attorney, Agent, or Firm*—Parkhurst & Oliff

[57] ABSTRACT

An apparatus for cooling an intercooler of a motor vehicle, which is located adjacent to a negative boundary pressure area of the vehicle, comprising an electrically driven fan which introduces cold air to the intercooler, a sensor for sensing the speed of the vehicle, and a unit for controlling the fan in response to the speed of the vehicle. The fan is rotated in a direction in which the outside air can be introduced into the vehicle only when the vehicle speed is lower than a predetermined value.

3 Claims, 6 Drawing Figures

APPARATUS FOR COOLING AN INTERCOOLER

BACKGROUND OF THE INVENTION

1. Field of the Invention

The present invention relates to an apparatus for cooling an intercooler in a motor vehicle.

2. Description of the Related Art

Almost all apparatuses for cooling the intercooler which cools the air intake of a motor vehicle are of the type in which cold air is introduced into the motor vehicle from the outside. The cold air is introduced into the vehicle by a pressure produced in the vicinity of the outer periphery of the vehicle, i.e. in a boundary area between the vehicle surface and the atmosphere. Accordingly, if the intercooler is located in an area of the vehicle in which the pressure is positive, the cold air from outside can be introduced into the intercooler through a hooded vent located in front of the intercooler, with regard to the forward direction of travel of the vehicle, without the need for a specific introduction means such as a fan. However, if the intercooler is forced to be located adjacent to an area in which the boundary pressure is negative, which location would occur, for example, when there is not sufficient space for the intercooler in a positive pressure area, depending on differences in the location of the engine or the kind of motor vehicle, air is blown from the inside to the outside of the vehicle, and accordingly, the amount of cold air that can be provided at the intercooler only by the air pressure is insufficient thus resulting in a necessity for the provision of an electrically driven fan for forced cooling. When a fan is provided, the fan must be driven so that the air is blown from the inside to the outside of the vehicle along the direction of from a high to a low pressure to increase the amount of cold air impinging on the intercooler. On the other hand, to increase the cooling effect on the intercooler, it is desirable that cold air from the outside be introduced into the vehicle. The above two requirements are obviously contrary to each other, and thus an intercooler cooling apparatus which satisfies those two requirements has not been provided as yet.

SUMMARY OF THE INVENTION

Accordingly, the primary object of the present invention is to provide an apparatus for cooling an intercooler which can be located adjacent to a negative boundary pressure area of the vehicle and which is cooled by an electrically driven fan, and which can satisfy the requirements for the provision of a sufficient amount of cold air and an increased cooling effect.

In order to achieve the above mentioned object, according to the present invention, there is provided an apparatus for cooling an intercooler which is located adjacent to a negative boundary pressure area of a vehicle, comprising an electrically driven fan for introducing cold air to an intercooler body or a cooling system thereof, a speed sensing means for detecting a speed of an associated vehicle, and a control means for controlling the driving of the fan in response to a vehicle speed signal from the speed sensing means. The electrically driven fan is driven to rotate in a direction such that the outside air is introduced into the vehicle only at a vehicle speed at which the negative boundary pressure, which is an absolute value, is lower than a predetermined value.

DESCRIPTION OF THE PREFERRED EMBODIMENTS

Figure 1:
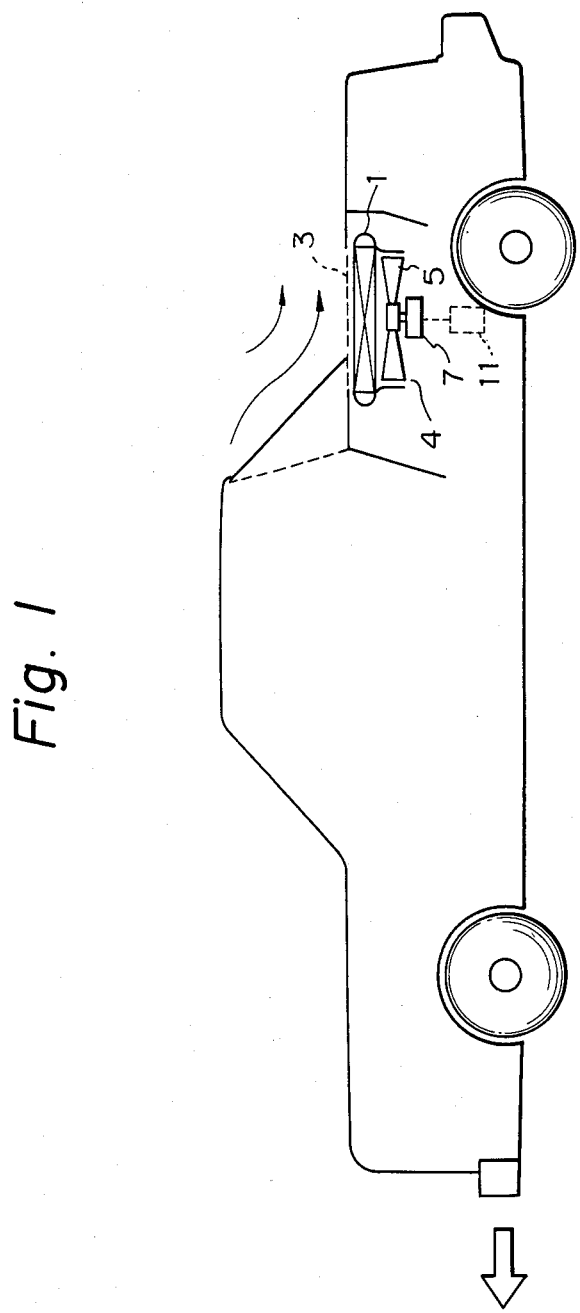
FIG. 1 is a schematic view of a motor vehicle having an apparatus for cooling an intercooler according to the present invention.

In the illustrated embodiment, the intercooler 1 is located in a space 4 below a rear hooded vent 3. Note, the location of the intercooler 1 is not limited to the illustrated arrangement, insomuch as the intercooler 1 can be located in any place in which the pressure produced in the vicinity of the outer periphery (boundary) of the vehicle is negative when the vehicle is moving. The "pressure" referred to herein means a pressure which is produced at a boundary layer of an object moving in the air, in accordance with aerodynamic principles. Generally speaking, the pressure is positive on the front side of the vehicle and negative on the rear side thereof. However, it will be obvious that a negative boundary pressure area can occur at the front side of the vehicle, and vice versa. Furthermore, it should be noted that the pressure, per se, varies in accordance with the speed of the vehicle, and thus the negative pressure area can be converted to a positive pressure area, and vice versa. In the illustrated embodiment, the hooded vent 3 is subject to a negative pressure in accordance with the speed of the vehicle. Note that the front of the vehicle is shown as facing to the left in FIG. 1.

Below the inter cooler 1, a cooling fan 5 is provided to increase the effect of cooling on the intercooler 1. The cooling fan 5 is electrically driven by a motor 7.

The fan 5 can directly cool the body of the intercooler 1. Alternatively, if the body of the intercooler proper is located below the intercooler 1, and if a cooling system (pipes etc.) is located directly below the hooded vent 3, it is also possible to cool the cooling system, rather than the body of the intercooler 1, by the fan 5. That is, the "cooling of the intercooler" referred to herein includes not only a direct cooling of the intercooler body but also cooling the intercooler system (pipes, etc.).

The direction of rotation of the fan 5 is controlled in accordance with the speed of the associated vehicle, by means of a control unit 11. Namely, the fan 5 is rotated in a direction in which outside air is introduced into the vehicle when the vehicle speed is lower than a predetermined value. The fan 5 is electrically connected to the control unit 11 shown in FIG. 2.

Figure 2:
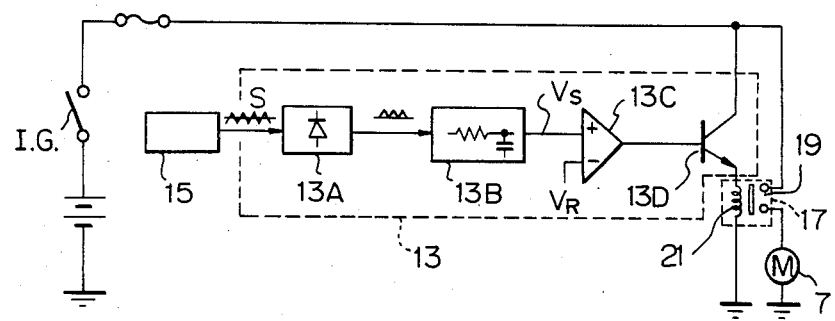
FIG. 2 is a schematic view of a control unit for controlling the driving of an electrically driven fan, according to the present invention.

In FIG. 2, the control unit 11 comprises a relay 17 which makes the motor 7 ON and OFF, and a relay driving circuit 13 which is driven in response to a signal S representing the vehicle speed and output by the speed sensor 15. The speed signal from the speed sensor 15 is rectified by a rectifier 13A and then integrated by an integrater 13B. The integrated signal Vs is compared with a predetermined set value $V_R$ by a comparator 13C. When the intergrated signal Vs is lower than a predetermined set value, a driving transistor 13D drives the relay 17 to make it ON, and thus rotate the motor 7. Namely, when the vehicle speed V (FIG. 3) is lower than a predetermined value Vo (FIG. 3), a relay coil in the relay 17 drives a relay contact 19 so that the relay 17 is made ON to drive the motor 7. Note, in FIG. 2, I.G. denotes an ignition switch.

It should be appreciated here that when the vehicle speed is low, the pressure acting on the hooded vent 3 is a positive pressure or atmospheric pressure, and accordingly, the outside atmospheric air flows toward the intercooler 1, and therefore, toward the fan 5 from the hooded vent 3. Therefore, when the motor 7 is rotated in a forward direction, the fan 5 introduces a large amount of cold air from the hooded vent 3 onto the intercooler 1 to effectively cool the intercooler 1.

The fan blades (not shown) of the fan 5 are designed so that the fan 5 can introduce the ambient air from the hooded vent 3 when the motor 7 is rotated in the forward direction.

When the vehicle speed increases, so that the boundary pressure acting on the hooded vent 3 becomes negative, the air flow is reversed, i.e., the air flows from the inside to the outside of the vehicle. Namely, the air is blown out of the hooded vent 3 from the space 4. This reverse flow of air is contrary to the direction of the flow of air introduced by the fan 5, and accordingly, the fan 5 is subjected to a large air resistance. In view of this resistance, according to the present invention, rotation of the motor 7 is preferably stopped at a vehicle speed in which the boundary pressure acting on the hooded vent 3 is negative, in order to stop the rotation of the fan 5. This also decreases the consumption of electrical power. In addition, according to the present invention, when rotation of the motor 7 is stopped, the cold air is introduced into the intercooler 1 from the bottom of the vehicle only by the pressure difference between the outside and inside of the vehicle, and is blown out of the vehicle through the hooded vent 3.

Figure 3:
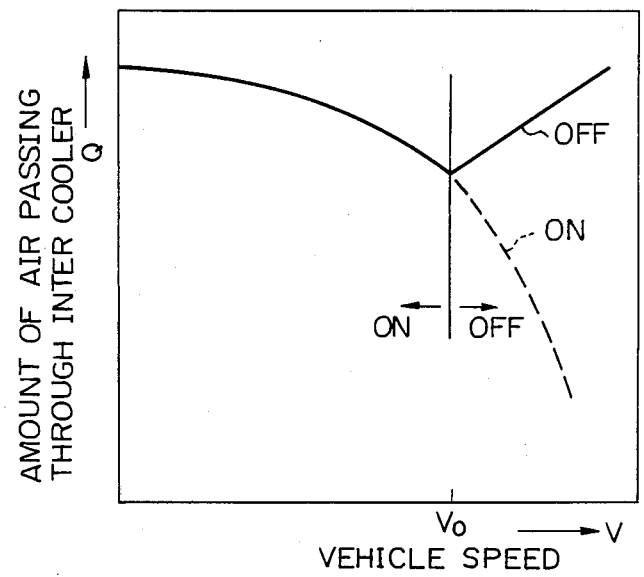
FIG. 3 is a diagram showing a relationship between the vehicle speed and the amount of cold air to be introduced, in accordance with the control unit shown in FIG. 2.

Consequently, according to the present invention, by selectively operating the fan 5 in response to the vehicle speed, as mentioned above, the amount Q of cold air to be introduced which would otherwise largely decrease as shown by phantom line (ON) in FIG. 3 if the fan continues to rotate even after the vehicle speed V is above the predetermined value Vo, can be increased as shown by a solid line (OFF) in FIG. 3. This results in a greatly increased cooling effect.

Figure 4:
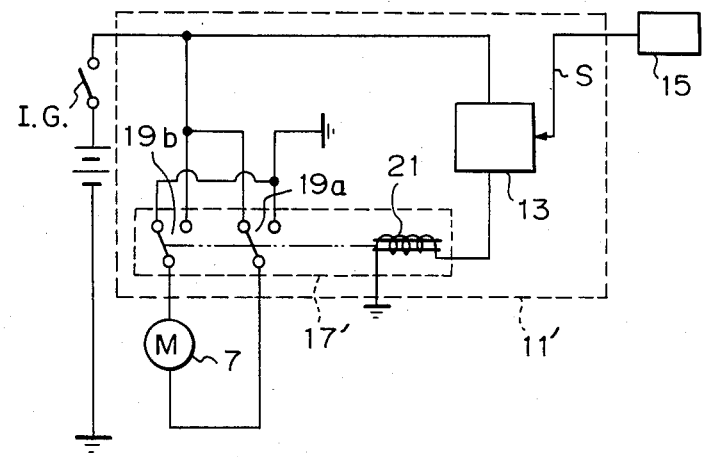
FIG. 4 is a schematic view of another embodiment of a control unit for the electrically driven fan.
Figure 5:
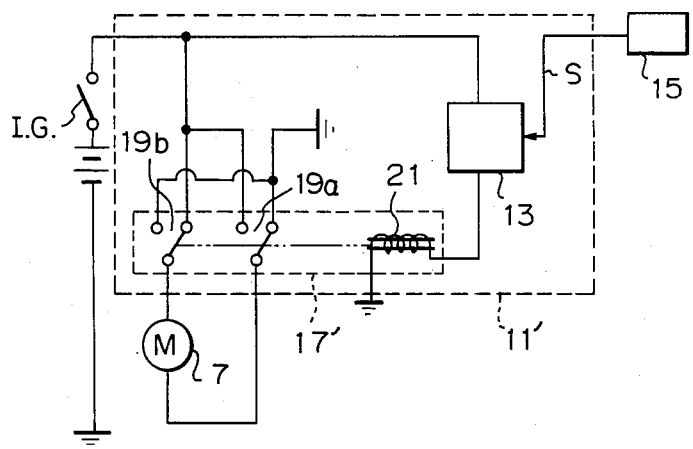
FIG. 5 is a view similar to FIG. 4, but with relay contacts located in a second position; and, FIG. 6 is a diagram similar to FIG. 3, but in accordance with the control unit shown in FIGS. 4 and 5.

FIG. 4 shows another arrangement of the control unit 11' in which the fan 5 is rotated in a reverse direction by driving the motor 7 in a reverse direction when the vehicle speed V is higher than the predetermined value $V_0$, unlike the arrangement shown in FIG. 2 in which the fan 5 is stopped when V is higher than $V_0$, as mentioned above. According to the arrangement illustrated in FIG. 4, the introduction of a further increased amount of cold air can be expected. Namely, in FIG. 4, the integrated signal Vs from the integrater 13B (FIG. 2) is higher than the predetermined value $V_R$ in the comparator 13C (FIG. 2), and thus the motor 7 is driven in the reverse direction. To attain this reverse drive, the relay 17' has two relay contacts 19a and 19b which are actuated by the relay coil 21. The relay contacts 19a, 19b can occupy a first position (FIG. 4) in which the motor 7 is rotated in a forward direction, and a second position (FIG. 5) in which the motor 7 is rotated in a reverse direction. With this arrangement as shown in FIG. 5, the motor 7, and accordingly, the fan 5 are driven in a reverse direction when the vehicle speed V is higher than the predetermined value $V_0$, without the necessity for stopping the motor 7. It will be easily understood that, with the arrangement illustrated in FIG. 4, a larger amount of cold air can be passed over the intercooler 1 from the bottom of the vehicle and can be blown out from the space 4 through the hooded vent 3, in comparison with the arrangement in FIG. 2 in which the fan 5 is stopped when V is higher than $V_0$, as mentioned hereinbefore. The increased amount Q of cold air introduced with the arrangement shown in FIG. 5 is shown in FIG. 6.

Figure 6:
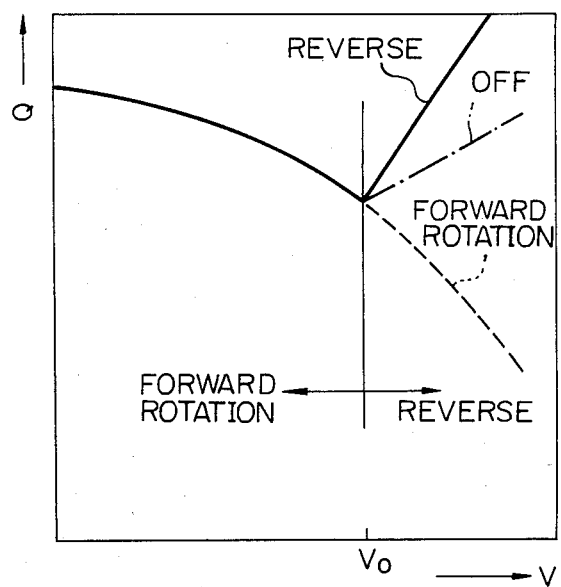

In FIG. 6, when the boundary pressure acting on the hooded vent 3 becomes negative, direction in which the motor 7 is driven is reversed without stopping the rotation thereof, and accordingly, cold air can be introduced by the fan 5 in addition to the cold air introduced due to a pressure difference between the inside and the outside of the vehicle. As can be understood from the above description, according to the present invention, since the electrically-driven fan 5 can be rotated in a forward direction only when the vehicle speed is lower than a predetermined value, a sufficient amount of cold air can be introduced for cooling the intercooler 1 at a relatively low vehicle speed, to maintain the desired cooling effect.

Furthermore, according to the present invention, since the fan 5 is stopped or reversed at a relatively high vehicle speed, a larger amount of cold air for cooling the intercooler 1 can be introduced by a pressure difference and/or the fan 5, thus resulting in a higher cooling effect on the intercooler 1.

In addition, according to the present invention, if the electrically driven fan 5 is stopped at a high vehicle speed so that the cold air can be introduced only by the pressure difference, a decreased consumption of electrical power by the fan 5 can be expected, resulting in an increased operating life for the electrically driven fan 5 and the driving motor 7.

We claim:

1. An apparatus for cooling an intercooler of a motor vehicle, which is located adjacent to a place in which a pressure produced in the vicinity of a boundary periphery of a vehicle body is negative, comprising an electrically driven fan which introduces cold air to the intercooler, means for sensing the speed of the vehicle, and means for controlling the driving of the electrically driven fan in response to the speed of the vehicle detected by the sensing means, said electrically driven fan being rotated in a direction in which outside air can be introduced into the vehicle only when a speed of the vehicle represented by an absolute value is lower than a predetermined value.

2. A cooling apparatus according to claim 1, wherein said electrically driven fan is stopped when the vehicle speed is higher than said predetermined value.

3. A cooling apparatus according to claim 1, wherein said fan is driven in a reverse direction when the vehicle speed is higher than said predetermined value.

* * * * *